D. CARLOUGH, Jr. & E. BOGERT.
JOINT FOR CROSSING BARS.
APPLICATION FILED MAR. 8, 1915.
1,231,564.
Patented July 3, 1917.
2 SHEETS—SHEET 1.
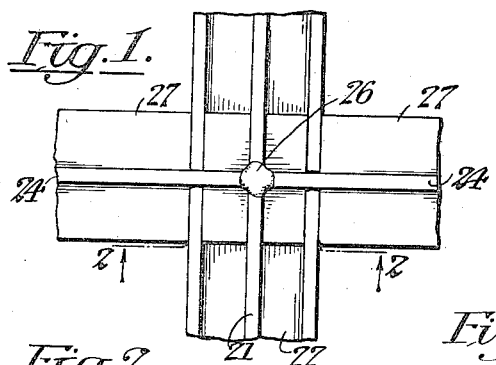
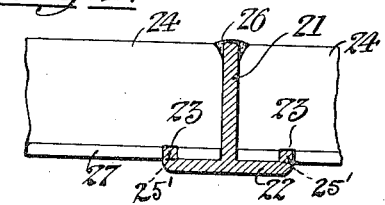
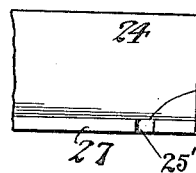
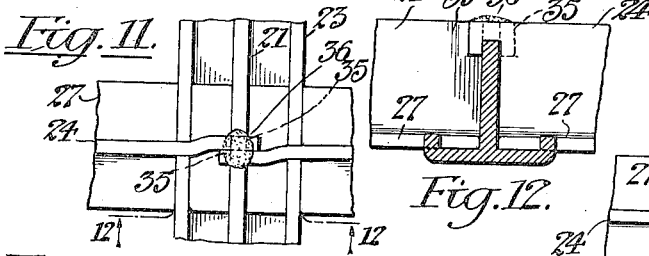
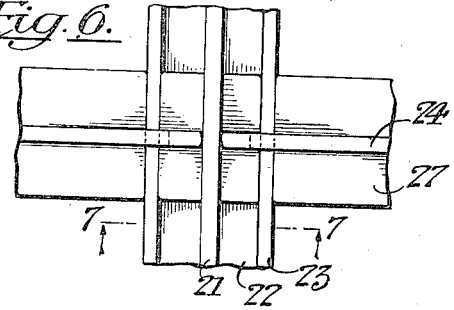
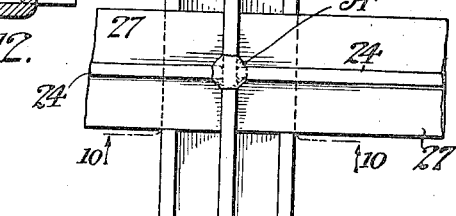
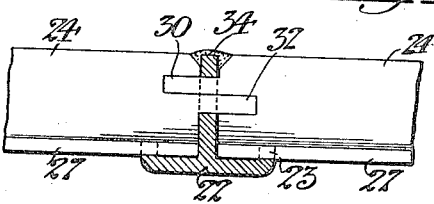
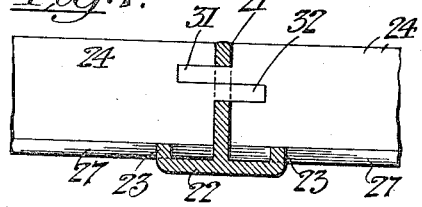
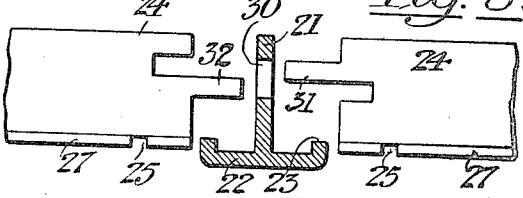
Witnesses:
Inventors,
Daniel Carlough Jr.
Eugene Bogert.
by their Attorney D. CARLOUGH, Jr. & E. BOGERT.
JOINT FOR CROSSING BARS.
APPLICATION FILED MAR. 8, 1915.

1,231,564.

Patented July 3, 1917.
2 SHEETS—SHEET 2.

Witnesses:

Inventors,
Daniel Carlough Jr.
Eugene Bogert.
by their Attorney
George P. Seull

UNITED STATES PATENT OFFICE.

DANIEL CARLOUGH, JR., AND EUGENE BOGERT, OF PATERSON, NEW JERSEY, ASSIGNORS, BY DIRECT AND MESNE ASSIGNMENTS, TO SAID BOGERT.

JOINT FOR CROSSING BARS.

1,231,564. Specification of Letters Patent. Patented July 3, 1917.

Application filed March 8, 1915. Serial No. 12,840.

*To all whom it may concern:*

Be it known that we, DANIEL CARLOUGH, Jr., and EUGENE BOGERT, both citizens of the United States, residing at Paterson, in the county of Passaic, State of New Jersey, have invented certain new and useful Improvements in Joints for Crossing Bars; and we declare the following to be a full, true, and exact description of said invention, such as will enable others skilled in the art to which it appertains to make use of the same.

The present invention relates to joints for crossing bars, particularly as adapted for metal sash construction and comprises a joint which is not only easy to manufacture, but which is rigid in construction.

With these and other objects in view, our invention consists of certain novel features of construction, combination and arrangement of parts as will be more fully described and pointed out in the appended claims.

In the drawings, Figure 1 represents a plan; and Fig. 2 a section on the line 2—2 of Fig. 1, of one form of joint; and Fig. 3 represenets a side elevation of one of the members of such joint;

Figs. 4 and 5 represent respectively the plan and the section on the line 5—5 of another form of joint;

Figs. 6 and 7 represent respectively the plan and section on the line 7—7 of another form of joint;

Fig. 8 represents the members, forming this particular joint, removed from each other to show their respective constructions;

Figure 13:
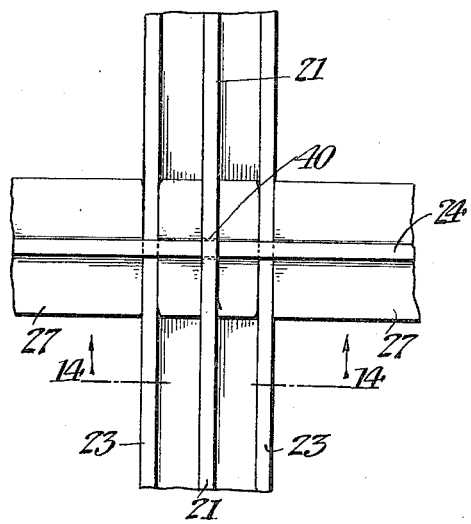
Figure 14:
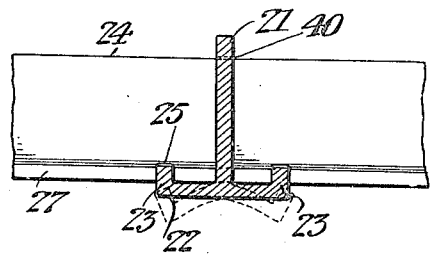
Figure 15:
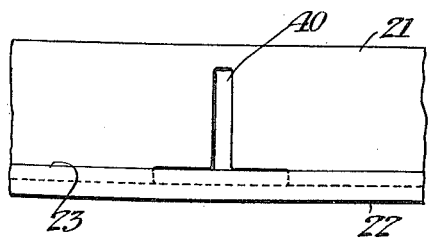
Figure 16:
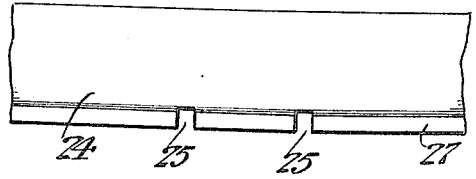

Figs. 9 and 10 represent respectively the plan and the section on the line 10—10 of another form of joint analogous to that shown in Figs. 6 and 7;

Figs. 11 and 12 show still another form in plan and sectional elevation on the line 12—12;

Figs. 13 and 14 show still another form in plan and sectional elevation on the line 14—14, and Figs. 15 and 16 show details of the construction of the form shown in Figs. 13 and 14.

The corresponding parts are referred to both in the drawings and in the specification by similar reference characters.

In each of the forms of joint illustrated, we use as one of the bars or crossing members a T-shaped member having a section, illustrated best in Fig. 2, which has a web 21 and a flange 22, this flange being provided preferably at each of its edges with an upturned rib 23. It will be understood that while we prefer to place this rib at the edge of the flange 22, it may be anywhere along said flange, and while we prefer to have this rib on the same side of the flange as the main web 21, it may be, for some. purposes, placed on the opposite side. The purpose of this rib is to provide a means by which the other member of the joint, which is the ordinary structural T, having the web 24 and the flange 27, may be interlocked with the flange 22 of the ribbed member.

In the form shown in Figs. 1, 2 and 3, this interlocking is obtained by cutting a groove 25 in the flange 27 of the T at such a distance from the end of the web 24 as will permit the same to abut against the web 21 when the groove 25 is placed over the rib 23. This interlock will prevent any motion longitudinally of the web 24 in a direction parallel to the line of intersection of the web 24 and the flange 27. It will not, of course, prevent the member 24 from being lifted vertically from the rib 23. To prevent this in the form shown in Figs. 1 and 2, we preferably spot-weld the junction of the webs 24—24 and 21 as shown at 26. Electric, or any other suitable form of welding may be used instead. As shown in these figures, the groove 25 does not extend entirely across the flange 27 but consists of two parts extending in from either edge of the flange 27 up to about the walls of the web 24. This leaves a small fin or web extending across the groove 25, as indicated at 25'. The rib 23 is notched correspondingly to admit this fin 25'. This fin 25' therefore serves to locate the T member in its relation to the axis of the ribbed member. It is, of course, obvious that the groove 25 may be cut through the flange 27 so that the fin 25' will be removed.

The joint shown in Figs. 4 and 5 is a slight variant of that shown in Figs. 1 and 2. In this joint the rib 23 is grooved to permit the flange 27 of the T bar to rest on the flange 22. Preferably in this form, the joint is made of two bars, instead of the three required in the joint shown in Figs. 1 and 2, the T-bar being grooved to permit the entrance of the web 21 and the web 21 being notched to interlock with the web 24 as shown at 28. To prevent the T-bar from being moved vertically, we spot-weld the webs as shown at 29.

Figs. 6, 7 and 8 show a form of joint in which it is unnecessary to use the spot-weld. The webs 24 of the T-bars are shaped as shown in Fig. 8, and the web 21 of the ribbed T-bar is punched as shown at 30 to permit the entrance of the two dowels 31—32 formed on the T-bars. The T-bars are also grooved at 25 in a manner similar to the form shown in Figs. 1 and 2 and the joint when completed is best shown in Fig. 7.

In order to permit the dowels 31—32 to enter the opening 30 of the web 21, the ribs 23 are bent downward to permit the flanges 27 to pass these ribs 23, when after the dowels 31—32 are in the opening 30, the ribs 23 will be bent back into the grooves 25.

Figs. 9 and 10 show a variant of the form shown in Figs. 6 and 7, in that instead of bending down the ribs 23 on the flanges 22 to permit the flanges 27 to be moved into contact with the web 21, the ribs 23 are themselves grooved in the manner shown in the form illustrated by Figs. 4 and 5, so that the dowels 31—32 may be moved into the opening 30. Thereafter to prevent these dowels from moving back again, we spot-weld the webs as shown at 34.

Figs. 11 and 12 illustrate another variant of the joint shown in Figs. 1 and 2. In this form the flanges of the crossing members are connected in the same manner as shown in Figs. 1 and 2, but the webs 24 instead of merely abutting the web 21, are provided with hooked extensions 35, the necks of which lie in a slot in the web 21, and the hooks extending over and engaging this web on opposite sides. In order to hold this joint, we apply the spot-weld to the webs as shown at 36.

Figs. 13 and 14 represent still another variant of our novel joint. In this form the web 21 of the ribbed T-bar is preferably made somewhat higher than the total height of the crossing T with the web 24 and flange 27. The flange 22 with its ribs 23 is bent somewhat in the manner indicated in the dotted lines 14, and thereafter the opening 40 is punched in the web 21. Preferably this opening is the shape of the section of the crossing T. This latter is provided with openings 25—25 through its flange and after the ribbed T-bar is bent and punched, the crossing T-bar is inserted through the opening 40 and the flange 22 and ribs 23 of the ribbed bar are returned to their normal position so that the ribs 23 engage with the openings 25. It will be noted that in this construction the bars are firmly locked together so that no movement in any direction is possible, and that this is obtained without distorting the metal or breaking the fibers of the rolled shapes. While preferably the opening 40 is made with the same shape as the cross section of the crossing T-bar, it is obvious that it may be of any shape, so long as the web of the ribbed bar contacts with some portion of the web of the crossing bar to prevent the latter from being moved longitudinally or vertically in relation to the ribbed bar.

It will also be noted that in the various forms in which the crossing bar is a continuous strip, engagement of one of the ribs 23 with the flange 27 will be sufficient to prevent movement of the crossing T longitudinally so that one of the ribs 23 might be dispensed with.

It will be noted that in the form illustrated in Figs. 7 and 8, the projections 31—32 need not extend into openings in the opposite webs, but that for some purposes their engagement beneath the web 21 will be sufficient. It will be understood, of course, that in the form illustrated in Figs. 7 and 8, the flange 22 and ribs 23 are bent in the manner indicated in Fig. 14 in order to permit the crossing T's to be placed in position.

While in this specification we have described our novel joint as being made up of T-bars, it should be understood that we use that term to describe any bar which has a web and a flange and not merely the shapes which are known technically as "T-bars".

While we have shown a number of forms of joints, it will be noted that each of them has as its principal feature the interlocking of the flanges of the crossing T's by reason of the presence of the rib 23.

Other forms may be used, but we do not wish to limit ourselves to the specific forms of our novel joint which we have chosen for purposes of illustration, except as indicated in the appended claims.

We claim:—

1. In a joint for bars, the combination of a first bar having a flange and a web and having a rib extending along its flange parallel to its web, and a second bar having a flange and a web with a slot in its flange extending across the width thereof, said rib fitting into said slot, and the bottom of the flange of the second bar being in contact with the top of the flange in the first bar, and connecting means between said bars to prevent their relative motion in a direction perpendicular to the planes of their flanges.

2. In a joint for bars, the combination of a first bar, having a flange and a web and having a rib extending along its flange parallel to its web, and a second bar having a flange and a web and having a slot in its flange fitted over said rib, the web of said first bar being provided with an opening and the web of said second bar extending into said opening.

3. In a joint for bars, the combination of a first bar having a flange and a web and having a rib extending along its flange parallel to and on either side of its web, and having an opening in its web closed at the top, a second bar having a flange and a web, the total height of said second bar being less than the height of the web of said first bar and having a slot in its flange fitted over said rib, said second bar extending through said opening in the web of said first bar.

4. In a joint for bars, the combination of the first bar having a web and a flange with a rib extending along the top of the flange parallel to the web, a second bar having a web and a flange, the flange of said second bar having a slot and said rib fitting into said slot, and the web of said second bar entering an opening in the web of said first bar, said opening being located so as to permit the entrance of the web of said second bar only when said rib is bent away from the position which it occupies when the joint is formed.

DANIEL CARLOUGH, Jr.
EUGENE BOGERT.

Witnesses:
JOHN H. JACOBUS,
ROBERT F. CARMICHAEL.

Copies of this patent may be obtained for five cents each, by addressing the "Commissioner of Patents, Washington, D. C."